Feb. 2, 1971 R. C. SCHWARTZ 3,560,088
COLLAPSIBLE REAR-SCREEN PROJECTION THEATRE
Filed May 20, 1969 3 Sheets-Sheet 1
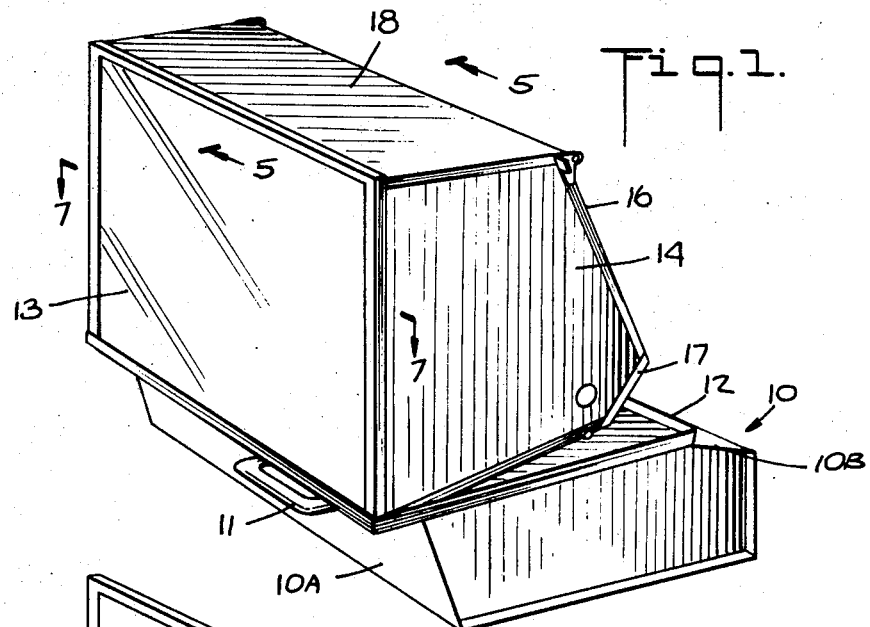
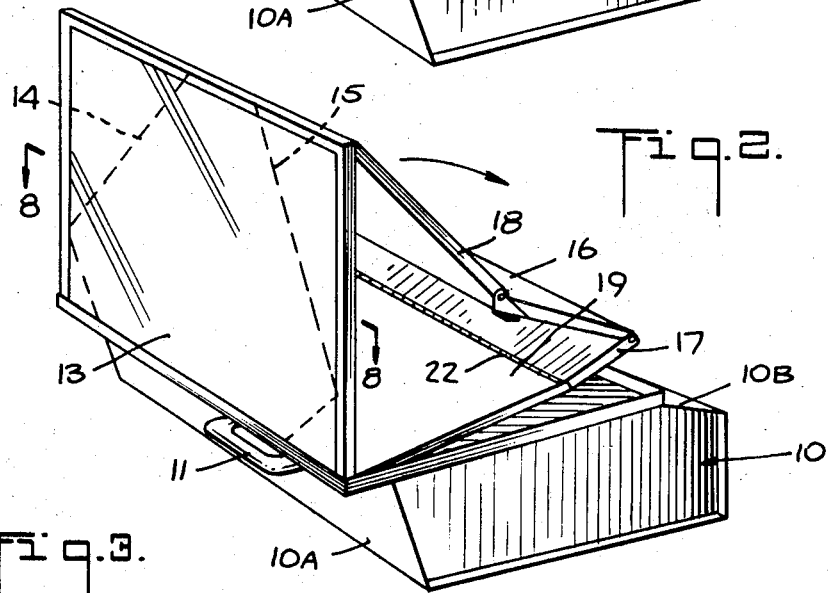
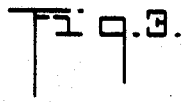
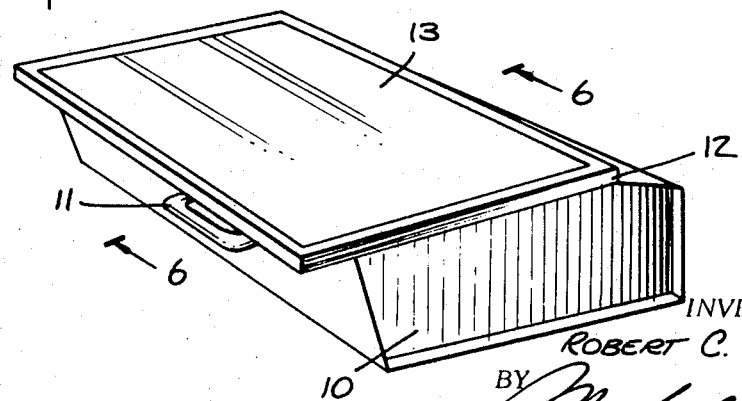
INVENTOR.
ROBERT C. SCHWARTZ
BY
ATTORNEY

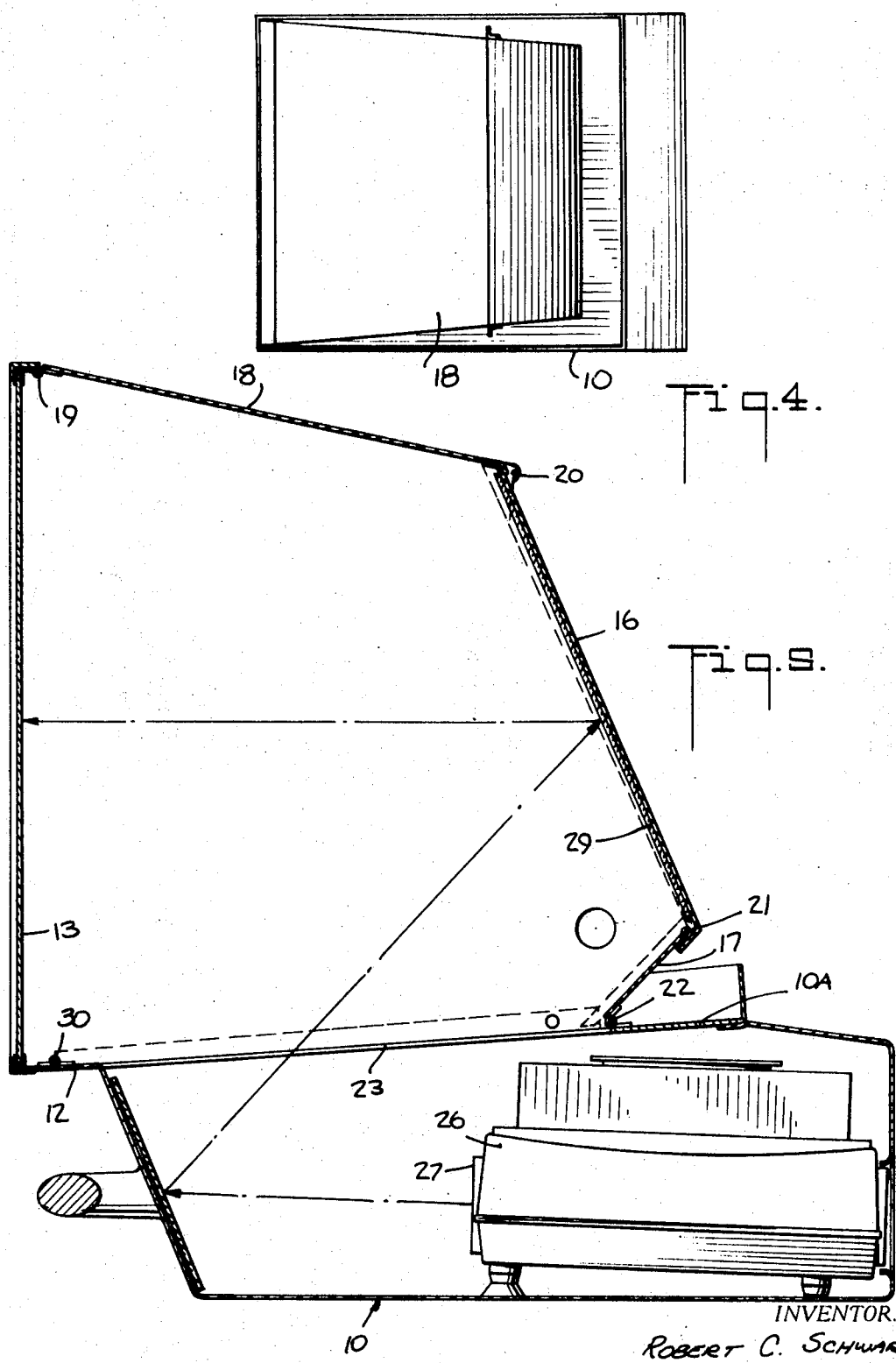

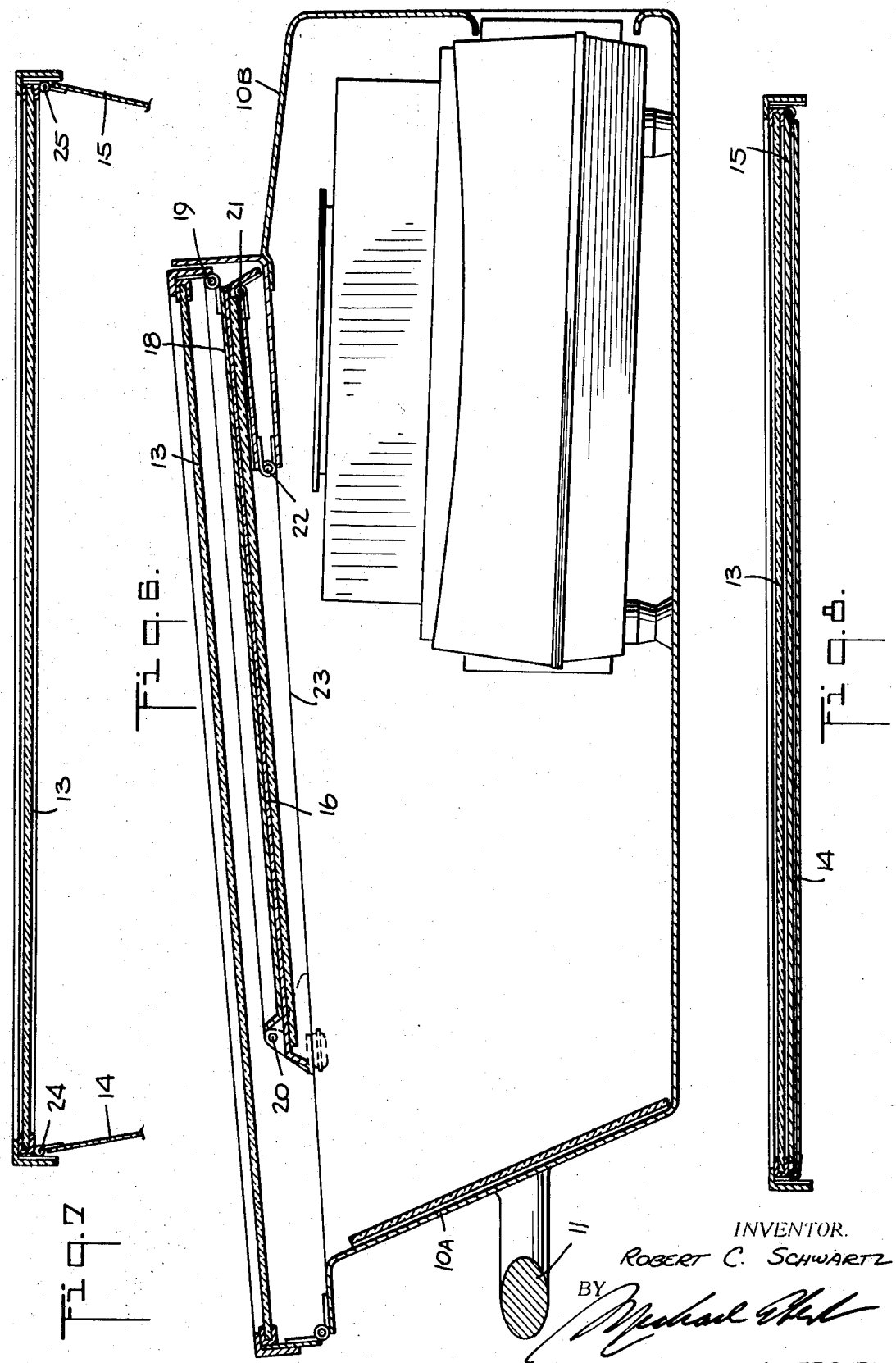

# United States Patent Office 3,560,088
Patented Feb. 2, 1971

3,560,088
COLLAPSIBLE REAR-SCREEN PROJECTION THEATRE
Robert C. Schwartz, Jamaica Estates, N.Y., assignor to Motiva Ltd., Jamaica Estates, N.Y., a corporation of New York
Filed May 20, 1969, Ser. No. 826,199
Int. Cl. G03b 21/28
U.S. Cl. 353—78                    5 Claims

ABSTRACT OF THE DISCLOSURE

A collapsible rear-screen projection theatre for successively presenting the images of film slides contained in a standard slide projector. The projector is installed in a box-like carrying case at an optical position to direct a slide image onto a first mirror secured to the inclined front wall of the case. Mounted above an opening in the top of the case is a foldable screen assembly having a second mirror secured to an inclined rear panel thereof, such that when the assembly is in the erect state, the slide image is reflected by the first mirror through the opening onto the second mirror which, in turn, directs the image onto the rear of a translucent screen.

BACKGROUND OF INVENTION

This invention relates generally to rear-screen projection systems for film slides, and more particularly to a self-contained viewer wherein a standard film projector is housed within a collapsible theatre which, when erected, is adapted to project slide images onto the rear of a viewing screen.

In order to present film slides in a continuous sequence, existing slide projectors make use of slide trays in combination with an indexing mechanism adapted to transfer the slides successively into the optical path for projection. For example, in the slide projectors manufactured and sold by Eastman Kodak Company under the trademarks "Carousel" and "Ektagraphic," the slide tray is in the form of a circular turntable which is indexed to successively project slides withdrawn from the circular array thereof in the tray.

In a conventional projection arrangement, the picture is cast onto the front of a screen disposed in a room at a suitable distance from the projector. This arrangement is generally acceptable in the home, where the room may be darkened and where a screen may be conveniently set up. However, the appearance of the visual image is determined to a great extent by contrast with its background. In conventional front-screen projection, the screen brightness is directly affected by ambient lighting conditions, and in a brightly lit room it is virtually impossible to see the image when using front-screen projection.

There are many situations in which front-screen projection has distinct drawbacks. Thus, at trade shows and conventions as well as in showrooms, slide projectors are often used to present relevant promotional material. When an exhibitor has an assigned booth in a convention hall, he finds it difficult to set up a front-view screen within the confines of his assigned space so that it can be readily viewed by visitors. Moreover, the bright lighting in a typical hall or show room militates against an effective front-screen presentation.

This same problem arises in other situations calling for audio-visual communication, as in museums, department stores and shopping centers, where the environmental illumination is ordinarily bright and space is limited. The need exists therefore for a compact projection theatre capable of being quickly installed and adapted to present bright and clear slide images.

BRIEF DESCRIPTION OF THE INVENTION

Accordingly, it is the main object of this invention to provide a self-contained rear-screen theatre which incorporates a standard slide projector and is capable of producing images having a high degree of visibility even in brightly lit rooms.

A significant advantage of the invention is that in rear-screen projection, the image is focused on the sensitive rear surface of a fairly dark translucent screen, thereby enhancing the contrast between the picture and the screen background.

Also an object of the invention is to provide a self-contained theatre of the above type which is lightweight and portable, and which may be conveniently carried and quickly erected. A theatre in accordance with the invention is usable in showrooms, in convention booths and in all other situations where front-screen projection is precluded or is disadvantageous.

Yet another object of the invention is to provide a theatre of the above type which is substantially light-tight to produce clear images of good quality.

Briefly stated, these objects are attained in a collapsible rear-screen projection theatre for successively presenting the images of slides contained in a standard slide projector. The theatre includes a box-like carrying case in which the slide projector is installed at a position optically to direct a slide image onto a first mirror mounted on the inclined front wall of the casing. A foldable screen assembly is supported about an opening in the top wall of the case within a rectangular frame which is displaced forwardly to overhang the front wall.

The assembly comprises a translucent screen whose lower edge is hinged to the front side of the frame, whereby in the collapsed state, the screen folds into and is protectively received within the frame. The upper edge of the screen is hinged to the long side of a top panel having a trapezoidal form, the opposite side of the panel being hinged to the long side of a major rear panel of trapezoidal form, whose opposite side is hinged to the long side of a minor rear panel. The opposite side of the minor rear panel is hinged to the rear edge of the openings, whereby in the collapsed state, the minor rear panel lies against the top wall of the casing within the frame, the major rear panel lies over the minor panel, the top panel lies over the major panel, and the screen lies thereover to provide a highly compact structure.

In the erect state, the major rear panel, which has a second mirror mounted thereon, occupies an inclined plane so related to the plane of the inclined first mirror, whereby images reflected by the first mirror onto the second mirror are directed thereby onto the rear surface of the screen.

BRIEF DESCRIPTION OF THE DRAWING

For a better understanding of the invention, as well as other objects and further features thereof, reference is made to the following detailed description to be read in conjunction with the accompanying drawing, wherein:

FIG. 1 is a perspective view of a collapsible rear-screen projection theatre in accordance with the invention, the theatre being shown in the erected state;

FIG. 2 shows the theatre in the process of being collapsed;

FIG. 3 shows the theatre in the fully collapsed state;

FIG. 4 is a plan view of the theatre in the erected state;

FIG. 5 is a transverse section taken in the plane indicated by line 5—5 in FIG. 1;

FIG. 6 is a transverse section taken in the plane indicated by line 6—6 in FIG. 3;

FIG. 7 is a longitudinal section taken in the plane indicated by line 7—7 in FIG. 1; and FIG. 8 is a longitudinal section taken in the plane indicated by line 8—8 in FIG. 2.

DESCRIPTION OF INVENTION

Referring now to the drawing, and in particular to FIGS. 1, 5 and 7, showing the rear-screen projection theatre in its erected state, it will be seen that the theatre comprises a box-like carrying case or cabinet, generally designated by the numeral 10, having a handle 11 secured to the inclined front wall 10A thereof.

Secured to the top of case 10 is a rectangular frame 12 which is displaced forwardly so as to overhang the front wall 10A of the case. Supported within the frame is a foldable screen assembly constituted by a screen 13, side panels 14 and 15, a major rear panel 16, a minor rear panel 17, and a top panel 18.

Screen 13 is rectangular in form and is preferably constituted by a sheet of fairly dark translucent material acting to enhance the contrast between the illuminated picture and screen background. In practice, the screen may be of the high-gain type known commercially as a "Polacoat Lenscreen," whose front surface has a special nonglare coating thereon to diffuse harsh reflections. The lower edge of screen 13 is pivotally connected by hinge 30 to the front section of frame 12, the dimensions of the screen being such that when in the collapsed state, the screen fits snugly within frame 12, as shown in FIG. 3.

The upper edge of screen 13 is pivotally connected by hinge 19 (note FIG. 5) to the long side of the panel 18, which is of trapezoidal shape, the opposite side of panel 18 being pivotally connected to the long side of the major rear panel 16 by hinge 20, which is also trapezoidal in form. The opposite side of major rear panel 16 is pivotally connected by hinge 21 to one side of the minor rear panel 17, whose other side is pivotally connected by hinge 22 to the rear edge of an opening 23 in the top wall.

As best seen in FIGS. 7 and 8, side panel 14 is pivotally connected by hinge 24 to one end of screen 13, while side panel 15 is pivotally connected to the other end of the screen by hinge 25. In the collapsed state, side panel 14 folds against the screen, and side panel 15 folds thereover. When the side panels are pulled out, as shown in FIG. 1, the various elements of the foldable screen assembly are maintained thereby in their erected state, but when the side panels are folded in, it becomes possible to collapse the assembly in the manner illustrated in FIGS. 2 and 3.

One may dispense with the rigid side panels and use in place thereof flexible plastic or fabric curtains, and provide spring biased hinges so that the foldable screen assembly will normally spring up to assume its erect state.

It will be seen in FIG. 6 that when the foldable screen assembly is collapsed, the minor rear panel 17 lies adjacent the top wall of the case, the major rear panel 16 lies over the minor panel, while above the major panel is the top panel 18, above which is screen 13. Thus all of the elements of the foldable assembly lie in parallel relationship in the collapsed state to provide a highly compact structure.

Installed within case 10 is a standard film slide projector 26, such as the Eastman Kodak "Carousel." The projector is placed adjacent the rear of the case with its lens barrel 27 arranged to direct an image of the operative slide toward a first mirror 28 mounted against the inner surface of inclined front wall 10A.

A second mirror 29 is mounted against the inner surface of the major rear panel 16, the panel inclination being such that mirror 29 lies in an inclined plane which is in such relation to that of mirror 28, such that the image reflected by mirror 28 is cast on mirror 29 and reflected thereby toward the rear surface of screen 13.

The mirrors are preferably of highly reflective design, with their silvering on the outer surface of the glass to prevent spurious or ghost images of the type encountered with conventional mirrors in which the light must travel through the glass before striking the silver layer. Ambient light is prevented from entering the theatre by side panels 14 and 15 and interfering with the picture, so that the only light striking the rear surface of the screen is that produced by the illuminated image.

Thus an extended folded optical projection path is provided, and despite the short distance between the projector and the screen, a relatively large, well-focused image is produced thereon. In practice, the structure may be made entirely of aluminum to attain high strength coupled with lightness of weight. The interior surfaces are preferably finished in baked enamel with a wrinkled surface for optimum wear resistance and minimum reflectivity.

While there has been shown and described a preferred embodiment of collapsible rear-screen projection theatre in accordance with the invention, it will be appreciated that many changes and modifications may be made therein without, however, departing from the essential spirit of the invention.

What I claim is:

1. A collapsible rear-screen projection theatre for a slide projector, said theatre comprising:
   (A) a box-like case for housing said projector, said case having an opening in the top wall thereof,
   (B) a first mirror secured to the front wall of the case, said projector being disposed to cast a slide image onto said mirror, said mirror being inclined to reflect said image through said opening,
   (C) a foldable screen assembly mounted on the top wall of said case, said assembly including a translucent screen whose lower edge is hinged to said case adjacent the front wall thereof, a top panel having one side thereof hinged to the upper edge of the screen, a major rear panel having one side thereof hinged to the other side of the top panel, and a minor rear panel having one side hinged to the other side of the major panel, the other side of said minor panel being hinged to the rear edge of said opening whereby in the collapsed state the minor panel lies adjacent the top wall, the major panel lies over the minor panel, while the top panel lies over the major panel and the screen lies thereover, while in the erect state said major panel is inclined, and
   (D) a second mirror so mounted on said inclined major panel as to intercept the image reflected by said first mirror and to direct it onto the rear surface of said screen.

2. A theatre as set forth in claim 1, further including side panels hinged to the ends of said screen and foldable thereagainst when the assembly is collapsed.

3. A theatre as set forth in claim 1, wherein said screen is provided with an outer coating to reduce glare.

4. A theatre as set forth in claim 1, wherein said mirrors have a silver coating on the outer surface thereof.

5. A theatre as set forth in claim 1, wherein said top panel and said major panel are trapezoidal in shape, said screen folded into a rectangular frame displaced forwardly from the top wall of said case to overhang said front wall.

References Cited

UNITED STATES PATENTS

| 703,858 | 7/1902 | Vautier | 95—11(M) |
|---|---|---|---|
| 3,413,061 | 11/1968 | Simpson et al. | 353—78X |

FOREIGN PATENTS

| 93,272 | 1/1969 | France. |
|---|---|---|
| 671,930 | 9/1929 | France. |
| 1,542,455 | 9/1968 | France. |

HARRY N. HAROIAN, Primary Examiner

U.S. Cl. X.R.

353—119